United States Patent [19]
Brunkhorst et al.

[11] 3,800,146
[45] Mar. 26, 1974

[54] PULSE OPTICAL RADIATION TRACKER

[75] Inventors: Lloyd E. Brunkhorst, Florissant;
Theodore G. Carr, Manchester;
James E. Dueker, Florissant, all of Mo.

[73] Assignee: McDonnell Douglas Corporation, St. Louis, Mo.

[22] Filed: May 10, 1973

[21] Appl. No.: 359,110

[52] U.S. Cl.............. 250/211, 250/203, 250/211 J, 250/212
[51] Int. Cl........................... G01j 1/20, H01j 39/12
[58] Field of Search......... 250/211, 212, 203, 211 J; 244/1 SS

[56] References Cited
UNITED STATES PATENTS

| | | |
|---|---|---|
| 3,351,493 | 11/1967 | Weiman et al.................. 250/212 X |
| 3,369,124 | 2/1968 | Dueker.............................. 250/212 X |
| 3,693,013 | 9/1972 | Dueker.............................. 250/203 R |
| 3,742,223 | 6/1973 | Carr................................... 250/211 J |

*Primary Examiner*—James W. Lawrence
*Assistant Examiner*—T. N. Grigsby
*Attorney, Agent, or Firm*—Charles B. Haverstock

[57] ABSTRACT

A pulse radiation tracker for producing pitch and yaw output information with respect to an object being located, tracked, or guided, said tracker including optical detector means responsive to detectable radiations emitted from the object or target, and circuit means for generating output signals to respresent pitch and yaw errors, respectively.

24 Claims, 7 Drawing Figures

PULSE OPTICAL RADIATION TRACKER

There are many aiming and tracking devices in existence including many which include radiation or light sensitive detector means as a part. Some of the known light sensitive detectors include means for producing quadrature output signal responses from which the location of an object can be determined. This can be done, for example, by detectors which produce outputs that depend on the location on the detector where the illumination received impinges. Detectors such as are capable of producing such outputs are disclosed in the following United States Letters Patent and copending applications.

Dueker U. S. Pat. No. 3,369,124, dated Feb. 13, 1968, entitled "Photovolatic Device For Indicating Position And Intensity Including Peripheral Electrode."

Dueker U.S. Pat. No. 3,693,013, dated Sept. 19, 1972, entitled "Video Tracking, Lateral Photoeffect Seeking Electro-Optical Detector."

Carr et al., U. S. Ser. No. 40,227, filed May 25, 1970, entitled "Wide Angle Lateral Photo-Detector Means."

Connors et al., U. S. Ser. No. 326,114, filed Jan. 23, 1973, entitled Grid Lateral Photodetector."

The detectors disclosed in these and other patents and applications can also be used for the detector means used with the present circuit construction. Detectors of the types disclosed in the aforementioned patents and applications have pairs of opposed output electrodes at which quadrature signals are produced that vary inversely with the distance from where the image or light spot impinges on the detector relative to the respective electrodes. For example, when light impinges closer to one output electrode than to the others a greater signal will be produced at that one electrode and lesser signals will be produced at the other electrodes. For tracking and guidance purposes it is often desired to keep the impinging radiation or light spot received from the object or target located at or near the center of the detector means so that all of the output signals will be equal or nearly equal. However, as is often the case, it may be desirable instead to keep the detector fixed and to determine the pitch and yaw errors which represent the location of the impinging light and hence of the object relative to two mutually perpendicular planes. The present device provides means for use in a tracking or other similar system for determining the pitch and yaw errors of a radiation source. A typical radiation source may be a visible or invisible light source, a laser source, and other types of sources including particularly pulsed light sources.

It is therefore an object of the present invention to provide circuit means for use with an optical detector that are capable of producing output indications which represent or indicate the pitch and yaw of an object being detected relative to some fixed location.

Another object is to provide means for determining the location of a radiation source such as a pulsed radiation source relative to two mutually perpendicular planes in space.

Another object is to provide means for indicating pitch and yaw errors of an object relative to some established line in space.

Another object is to provide improved means for locating, tracking and/or guiding an object in space.

Another object is to provide a relatively simple control circuit capable of responding to the outputs of an optical detector positioned and constructed to observe and detect emissions from an object for some purpose.

Another object is to provide more accurate and reliable means for tracking, locating and/or guiding an object relative to some location such as relative to a line in space.

Another object is to provide a control circuit for connecting to receive the outputs of an optical detector such as a quaternary optical detector, which circuit includes means to substantially reduce or eliminate noise and reduce the chances for error.

These and other objects and advantages of the present invention will become apparent after considering the following detailed specification in conjunction with the accompanying drawings which show preferred embodiments thereof and wherein.

Figure 1:
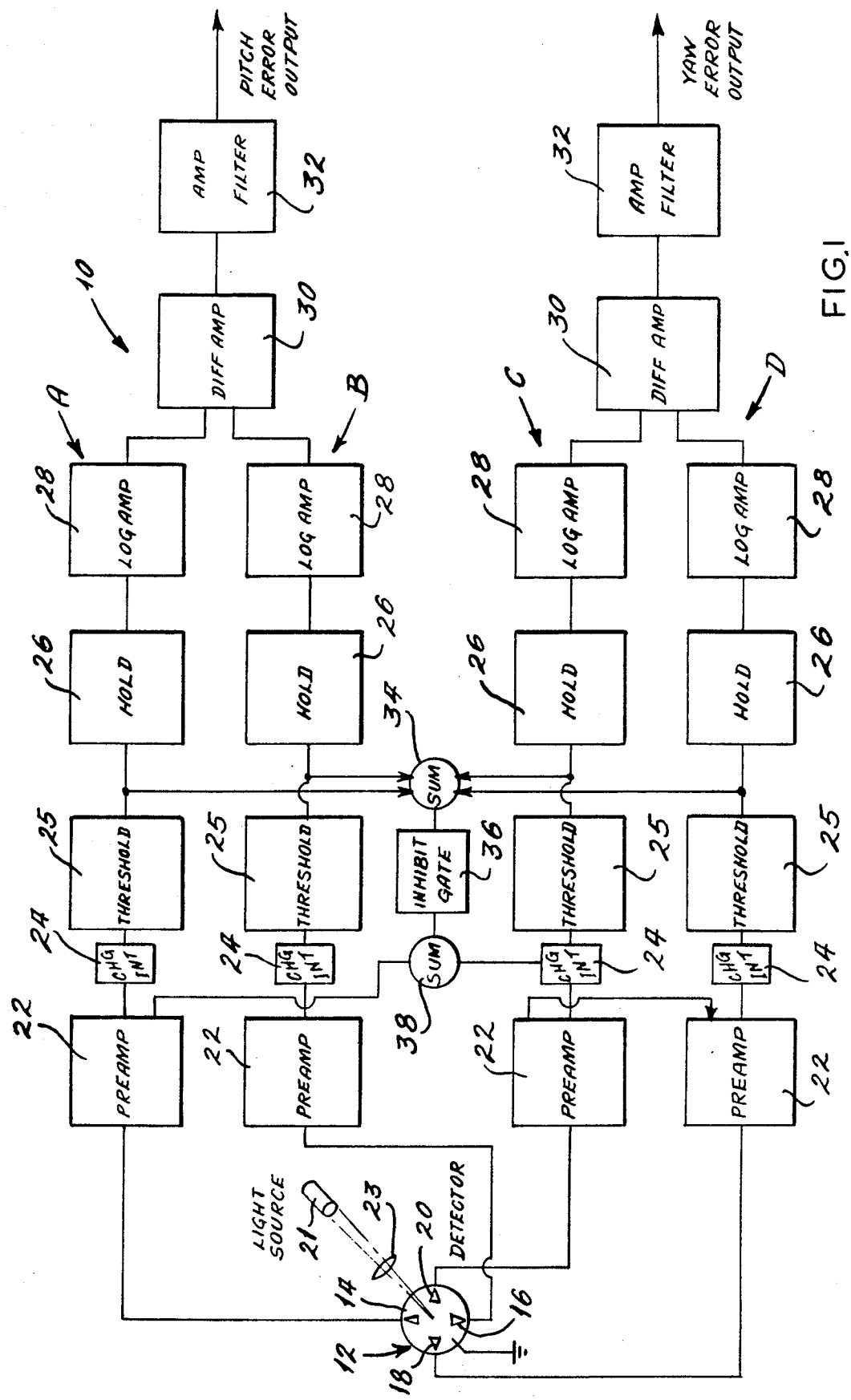
FIG. 1 is a block diagram of a circuit and an associated detector device constructed according to one embodiment of the present invention.

Referring to the drawing more particularly by reference numbers, number 10 identifies a tracking circuit which receives input information from a radiation sensitive detector 12. The detector 12 may be of one of the constructions disclosed in the above identified Dueker patents and the Carr et al and Connors et al pending applications. The detector 12 is shown having two pairs of opposed output electrodes 14 and 16 and 18 and 20 and is constructed so that when light from a remote object or target impinges on the subject detector or is focused into a spot thereon, electrical signal responses are produced at the various quadrature output electrodes 14–20. The magnitudes of the signals at each of the output electrodes depends upon the distance from where the signal impinges on or is focused on the detector and the respective electrodes and also on the intensity of the impinging light and the response characteristics of the detector. For example, if a light spot impinges on the detector closer to the electrode 14 than to the electrode 16 a larger response will be produced at the electrode 14 than at the electrode 16. The same is true for the electrodes 18 and 20 as well as between all of the said electrodes. In the construction as shown, the vertically oriented electrodes 14 and 16 produce the so-called pitch responses which indicate the vertical position of the object relative to an imaginary plane passing horizontally through the center of the detector 12, and the two electrodes 18 and 20 are oriented horizontally to produce the so-called yaw responses which indicate the horizontal position of the object relative to an imaginary plane passing vertically through the center of the detector. When the optical image is located at the center of the detector equidistant from all of the electrodes 14–20 the signals from all of the electrodes will be the same and there will be no pitch or yaw output responses. However, as the optical responses change due to movements of the impinging light relative to the electrodes, pitch and yaw responses will be produced by the circuit 10, the details of which are described later.

The optical responses sensed by the detector 12 may be pulse modulated light rays such as those from a pulse modulator laser 21 or they may be from some other light source including sources of coherent and incoherent as well as sources of visible and invisible light. The light may also be focused into a spot on the detector 12 by optical means such as condenser lens 23. The construction and operation of the subject means makes them useful for many applications including those already mentioned as well as applications in laser and other optical communication systems, alignment systems and/or tools, and the like.

The circuit 10 has four similar channels A, B, C and D, each of which has its input connected to a different one of a detector electrodes 14–20. For example, the channels A and B have their inputs connected to the vertically oriented opposed electrodes 14 and 16, and the channels C and D have their inputs connected respectively to the horizontally opposed detector output electrodes 18 and 20. Therefore, the channels A and B are used to determine the pitch error output and the channels C and D are used to determine the yaw error output. The error outputs in the sense used in this disclosure refer to positional responses of the impinging light, i.e., whether a light spot impinges at a point that is equidistance between the pairs of opposed electrodes or whether it is closer to one or several of the electrodes than to others. If the light spot is closer to one electrode in a pair than to the other, the error will be of one polarity with respect to that pair and will indicate the extent or amount of the error from the neutral or center position, and if the light spot impinges closer to the other electrode of said pair the error will be in an opposite sense or of an opposite polarity. The same is true for both pairs of opposed electrodes.

Each of the channels A, B, C and D includes a preamplifier circuit 22 which has its input connected to a respective one of the detector electrodes. The preamplifier circuits may be of conventional construction and are designed to have relatively low noise characteristics. The output of each of the preamplifier circuits 22 is connected directly but preferably through an associated charge integrator circuit 24 such as will be described later to the input of a threshold detector circuit 25 which may be similar to a limiter detector which is a circuit that is biased to eliminate any noise by passing only those signals or signal components that exceed the established threshold condition. The signals that get through the threshold circuits 25 in each channel are passed to a holding circuit 26 which is a circuit designed to stretch out short duration inputs that are received and pass these stretched signals to respective logarithmic amplifier circuits 28. The outputs of the log amplifier circuits 28 are passed as inputs to differential amplifier circuits 30, one of which is provided for each pair of the channels A and B and C and D. Each differential amplifier circuit 30 therefore receives inputs from two of the channels. The differential amplifier 30 associated with channels A and B therefore produces an output which is the difference between the signals generated at the two vertically oriented opposed electrodes 14 and 16. These difference signals represent the position of the light spot impinging on the detector 12 relative to the electrodes 14 and 16 and are representative of pitch. If for example, the light spot impinges at a location that is closer to the electrode 14 than to the electrode 16, the output of channel A will be larger than the output of channel B and the differential amplifier circuit 30 will detect this difference and will produce an output of polarity to represent this condition. The outputs of the differential amplifier circuit 30 are fed to amplifier-filter circuit 32 which also may be of conventional construction and the output of this circuit may be connected to some kind of an indicator or recorder means to visually or otherwise indicate the amount of pitch error.

The horizontally oriented detector electrodes 18 and 20 are similarly connected to the inputs of respective channels C and D which channels have the same basic elements as the channels A and B including logarithmic amplifiers connected as inputs to another differential amplifier circuit similar to the circuit 30. The outputs of this amplifier are fed to an amplifier-filter circuit for feeding to some kind of indicator or recorder which indicates yaw errors.

In addition to the basic circuit as described above, there are also provided other circuit means which are connected to the outputs of the four channel threshold detectors 25 in the manner shown. These circuit means include a summing circuit 34 which combines the quadrature signals and feeds the resultant to inhibit gate circuit 36. The circuit means 34 and 36 and another circuit means 38 are provided to enhance the signal-to-noise ratio of the subject circuit by using the combination of the outputs of the four different threshold circuits to generate an inhibit gate output that is of slightly shorter duration than the input radiation period. Thus when a pulse is detected, all of the preamplifier circuits such as the circuits 22 are gated off until shortly before the next pulse is anticipated. This is accomplished in the circuits just described by summing the outputs of the threshold detectors 24 and applying the signal sum to the inhibit gate 36 which in turn applies its output to the summing circuit 38. The output of the circuit 38 is then applied to the various preamplifier circuits 22 for control purposes in the manner shown in the drawing. In this way, a signal blanking action takes place between input pulses and this improves the signal-to-noise ratio and permits only the input impulses which exceed the threshold level and which occur after the inhibit cycle to pass through the channels A, B, C and D, and enter into the production of the output responses.

The electrical impulses produced at the output electrodes of the detector 12 vary in amplitude due to the input image radiation displacements or movements and also due to the radiation intensity and these variations can be expressed mathematically as follows:

$$v(r_1) = c\, e^{-\alpha r_1}$$
$$v(r_2) = c\, e^{-\alpha r_2}$$

Where:
- $c$ is a parameter that varies with the intensity of the light impinging on the detector 12;
- $\alpha$ is a constant, and;
- $r$ is the displacement of the input radiation from a position equidistant between one of the pairs of spaced opposed detector electrodes, $r_1$ being representative of the displacement of the light spot relative to one of the pairs of electrodes and $r_2$ the displacement of the light spot from the other electrode of the same pair.

The above signals received from the detector are first amplified by the respective preamplifier 22 and then fed to the respective threshold detectors 25 which are biased to pass only those portions of pulses that exceed some established threshold level. This is controlled by a biasing potential in the threshold circuits.

Thereafter, the holding circuits 26 in the respective channels stretch out the short duration input impulses it receives to provide longer duration input impulses for feeding to the respective logarithmic amplifier circuits 28. After taking the logarithm of the two signals in the respective channels the resultant outputs from each pair of channels are subtracted from each other in the associated difference amplifier circuits 30, and these circuits yield output voltages which are proportional to the image displacement away from a center position in the pitch or yaw planes. These output voltages can be designated $v_0$ and can be represented mathematically using the expressions derived above as follows:

$$v_0 = \log(v(r_1)/v(r_2)) = \alpha(r_1 - r_2)$$

In this expression, if $r_1$ is larger than $r_2$ the voltage $v_0$ will be positive or in one direction indicating that the light spot is closer to one of the pair of spaced electrodes than the other, and if $r_2$ is larger than $r_1$ the polarity of the output will be different and the light spot will be closer to the other electrode of said pair.

Figure 2:
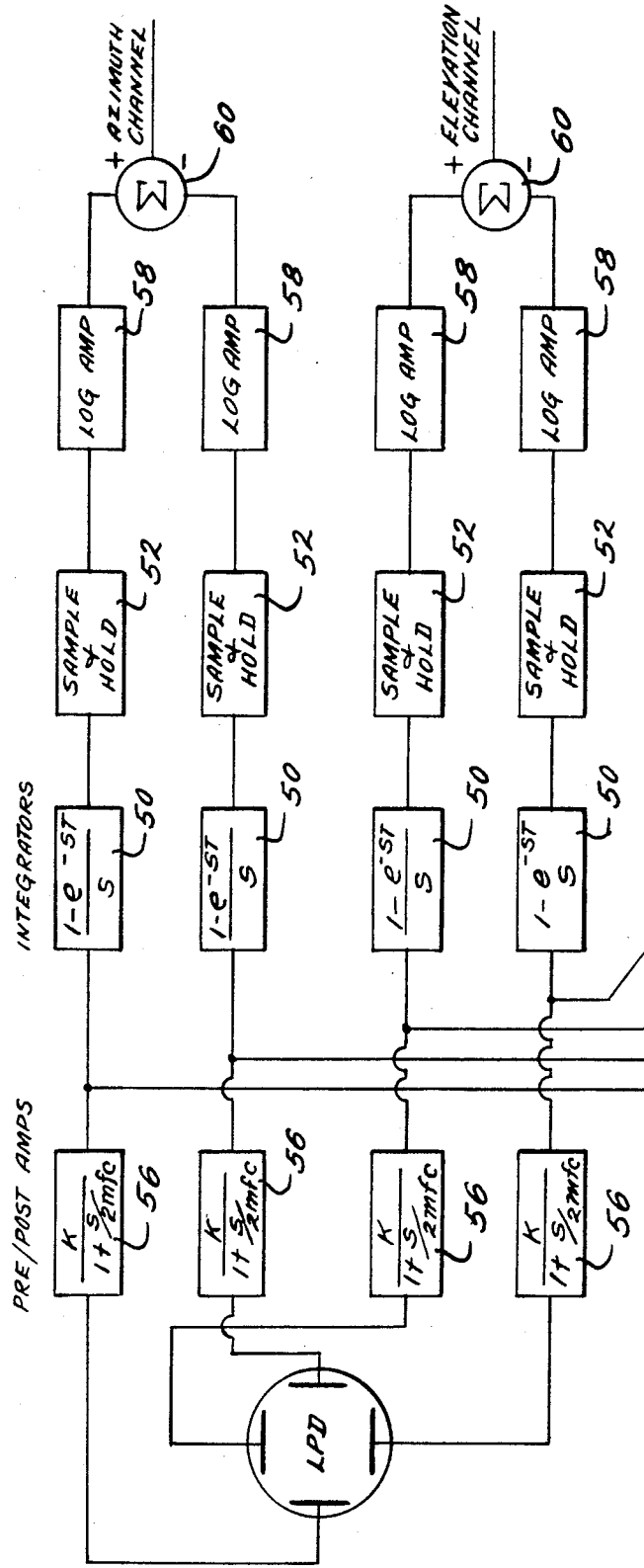
FIG. 2 is a block diagram showing a modified form of the subject tracker and seeker.

FIG. 2 shows a modified form of the subject tracker or seeker circuit in which an integrator circuit 50 in each channel is followed by a sample and hold circuit 52. In the circuit of FIG. 2 the current integrator circuits 50 are designed so that their operations are constrained by the timing requirements of the associated succeeding sample-and-hold circuits 52. Otherwise there is little or no effect on the performance of the threshold detection portion of the seeker means shown in FIG. 2 as compared to that shown in FIG. 1 since the detection function is not dependent on the performance of the integrator. The other channel circuit portions of the circuit of FIG. 2, namely, the pre-cost amplifier circuits 56, the log amplifier circuits 58, and the differential amplifier circuits 60 may be similar to the corresponding circuits of the construction shown in FIG. 1.

A theoretical analysis of the results of the circuit of FIG. 2 has been made and verified in practice using a straight forward statistical analysis of the test results. The analysis used is similar to one developed beginning on Page 285 of a book written by M. Schwartz and entitled "Information Transmission, Modulation, and Noise," published by McGraw Hill Book Company, Inc. in 1959. This analysis derives an expression for the normalized signal-to-noise ratio based on the assumption that the ratio of the square of the peak signal voltage and the square of the noise voltage is the parameter that is maximized, and that the statistics of the noise are Gaussian. The expression developed is:

$$\frac{\left|\int_{-\infty}^{\infty} F(jw)H(jw)e^{+jwt_0}dw\right|^2}{\int_{-\infty}^{\infty}|F(jw)|^2 dw \int_{-\infty}^{\infty}|H(jw)|^2 dw}$$

where:
- $F(jw)$ is the Fourier transform of the pulse shape,
- $H(jw)$ is the transfer function of the pulse processing filter, and
- $t_0$ is the time of occurrence of the peak of the output.

In both cases which are examined, $F(jw)$ is the transform of the square pulse of width $\tau$. In the first case, $H(jw)$ is the transfer function of a single stage, low-pass RC filter by itself and is expressed as:

$[K/1 + (jw/2\pi fc)]$ where, $$2\pi fc = 1/RC$$

In the second case, $H(jw)$ is the transfer function of a single stage RC low-pass filter followed by an integrate-and-dump circuit whose impulse response is a square pulse of unit height initiated at the origin of the pulse and terminated at time $T$, which is the integrate period. The results of these equations are plotted for examination in FIGS. 3, 4 and 5.

Figure 3:
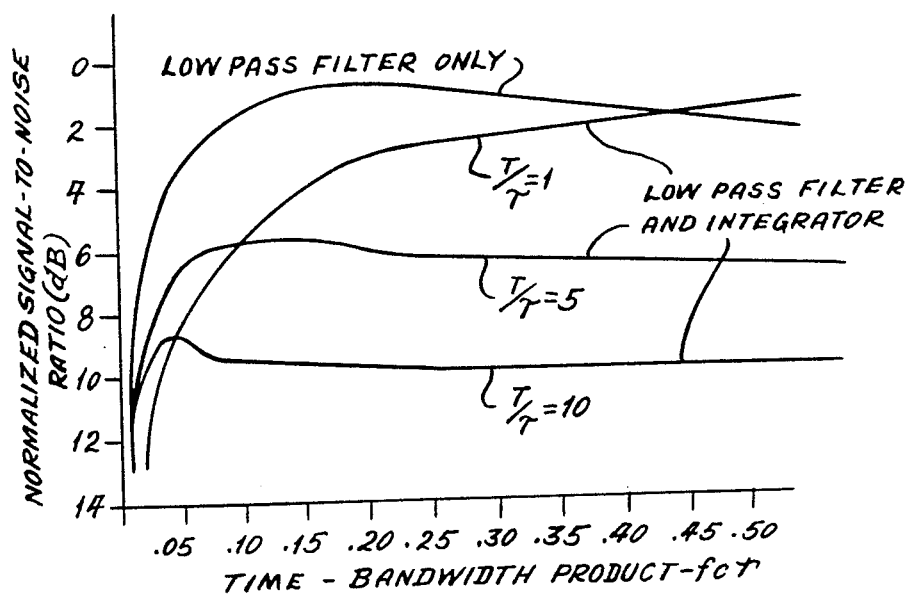
FIG. 3 is a graph of a normalized signal-to-noise ratio in decibels plotted as a function of the product of time and bandwidth for different $T/\tau$ ratios for a low-pass filter alone and for a low-pass filter combined with an integrator circuit.

FIG. 3 is a graph that compares the performance of a low-pass filter alone with that of the same low-pass filter combined with an integrator circuit. In this graph it can be seen that the low-pass filter (LPF) when operating without an integrator peaks at the point on the curve where $f_c\tau = 0.20$. Thus, if 8 megahertz preamplifiers are used they will be optimized for the purposes of detecting the presence of certain pulses such as 25-nanosecond pulses in the presence of Gaussian noise. The other curves shown in FIG. 3 are the curves which represent the signal-to-noise ratio for situations where the low-pass filter is combined with an integrator circuit operating at the different ratios of $T/\tau$, namely, $T/\tau$ ratios of 1, 5 and 10.

Figure 4:
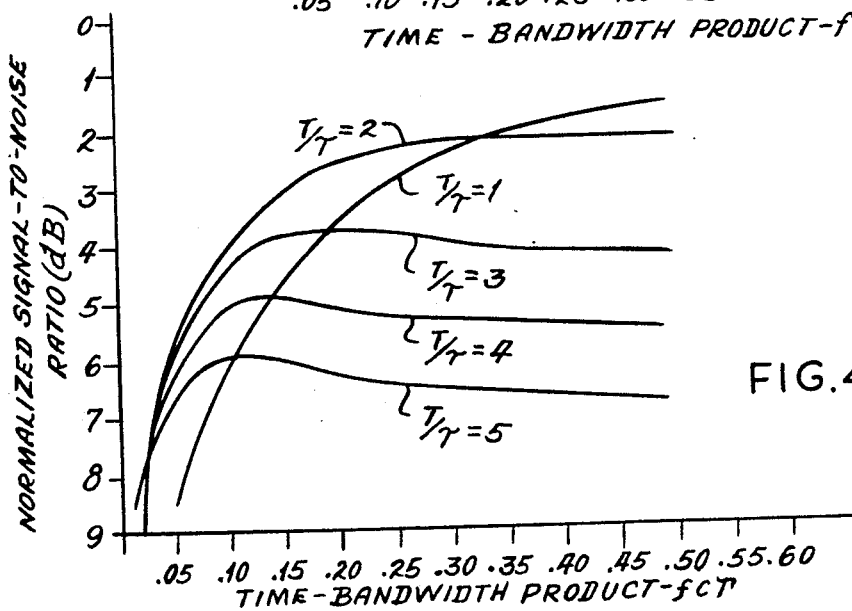
FIG. 4 is a graph of normalized signal-to-noise ratio as a function of $f_c \tau$ of an integrator circuit for various integrator times expressed as $T/\tau$.

FIG. 4 graphically illustrates the effect when evaluating the performance of the integrator circuits when operating by themselves at various $T/\tau$ ratios from 1 to 5 and for values of $f_c\tau$ less than 0.5. The curve for the ratio $T/\tau = 1$ approaches the zero decibel (dB) condition as the bandwidth of the preamplifier circuits approaches infinity. From this it can be concluded that the integrator circuits which integrate for the duration of square pulses are the optimum device with which to detect the pulses. An implementation that includes integrators, however, requires very wide band preamplification of the pulses. Furthermore, only one decibel of improvement is gained by the circuit which includes the integrator over the case where the low-pass filter is used by itself. Note also in FIG. 4 that as the value of the ratio $T/\tau$ increases the signal-to-noise ratio also increases.

If it is assumed that a value of $f_c\tau$ of 0.2 is desirable from a pulse detection standpoint, then it is also desirable to know what the value of the ratio $T/\tau$ is for a maximum processing signal-to-noise ratio in order to minimize the noise present in the output sometimes referred to as "angle jigger."

Figure 5:
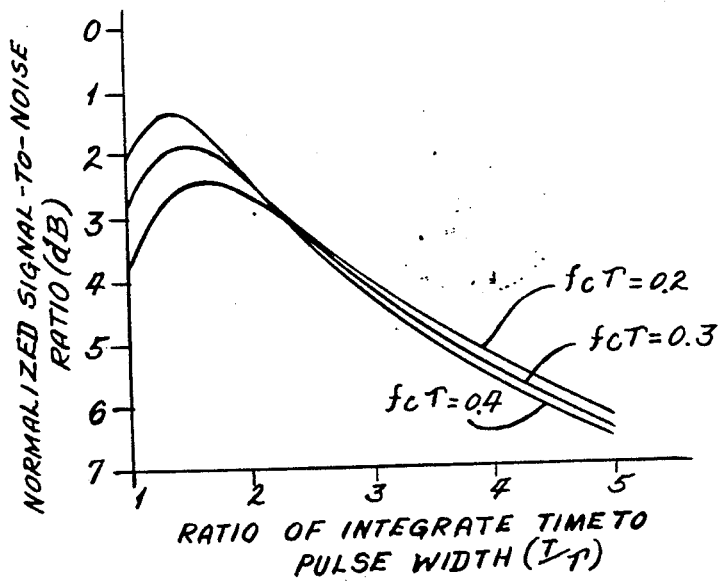
FIG. 5 is a graph of normalized signal-to-noise ratio as a function of the integrator time $T/\tau$ for various values of $f_c \tau$.

The graph in FIG. 5 shows the effect on the normalized signal-to-noise ratio of varying the $T/\tau$ ratio from 1 to 5 while holding the value of $f_c\tau$ constant at 0.2, 0.3 and 0.4. It can be seen that the maximum value of the signal-to-noise ratio is 2.3 dB in the case of curve where $f_c\tau = 0.2$ and this occurs at the ratio of $T/\tau = 1.6$. At that point the normalized signal-to-noise ratio is $-2.3$ dB which is only about 1.4 dB below the performance of the low-pass filter operating alone, see the upper curve in FIG. 3. The information included in the graphs of FIGS. 3, 4 and 5 is useful to enable an engineer or circuit design person to construct the subject circuit to obtain particular desired performance conditions. This is highly desirable to be able to do.

Figure 6:
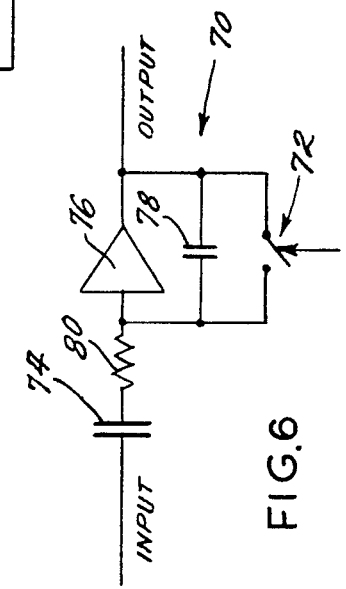
FIG. 6 is a schematic diagram showing one form of an integrating circuit for use with the present devices.

FIG. 6 shows a simplified circuit diagram of an integrator circuit 70 for use with the subject system. The integrator circuit 70 can be operated in either of two different modes, namely, an integrate mode and a dump mode. The selection of the desired mode is under control of a two position switch 72 which can be constructed using a field effect transistor (FET), a gate circuit, or any other similar fast-acting switching device including devices constructed using integrated circuits, transistors or other known semi-conductor devices. In the circuit as shown in FIG. 2, the sample-and-hold circuit 52 in each channel requires a certain amount of time such as 400 nanoseconds to acquire a change in the charge thereon. Therefore, the integrator circuit 50 that is selected must remain in its integrate mode long enough or until 400 nanoseconds has elapsed in the example given at which time another switch which is normally closed to connect the integrator circuit to the sample-and-hold circuit opens. This switch is not shown in the drawing. If the integrator circuit had been in its hold mode instead of its integrate mode the integration operation could have been terminated without dumping the integrator output. The integrator circuit construction of FIG. 6 has certain shortcomings including the fact that there are not means included in it to isolate it from the circuit immediately ahead of it, namely, from the threshold circuit. This means that the input capacitor 74 in the integrator circuit of FIG. 6 is tied to the previous circuit stage. The other elements in the integrator circuit of FIG. 6 include an amplifier 76 and an integrator capacitor 78, and an input resistor 80 connected as shown.

Figure 7:
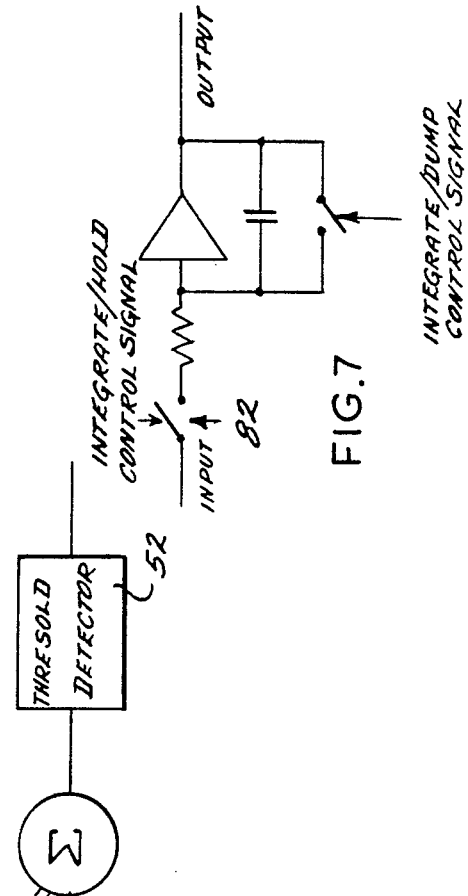
FIG. 7 is a schematic circuit diagram showing another embodiment of an integrator circuit for use with the subject device.

FIG. 7 shows another construction for the integrator circuit which overcomes the undesirable circuit interdependence that occurs with the construction of FIG. 6 and yet achieves the desired hold function. In the schematic of FIG. 7 an input switch 82 is provided to disconnect the integrator input from the preceding circuit stage. This means that with the circuit of FIG. 7, the input can float or be grounded as desired according to which condition turns out to be the better without effecting the operation of the previous stage. Various known switching devices can be used for the switch 82 including the same switch types mentioned above for the switch 72. In some cases, the type switches selected may introduce error voltages due to their associated drive circuits into the integrator circuit, but these can usually be compensated for by means of channel offset voltage adjustments. The input switch means 82 of FIG. 7 therefore provides the advantage of isolating the integrator circuits from their associated previous circuit stages.

The addition of integrating circuits in the places indicated makes it possible for the subject circuit channels to be more responsive to the entire amount of charge that is generated in the detector 12 due to light impinging thereon and not merely to an instantaneous condition such as measuring current at a particular instant or sampling and holding a particular level of input or using some other type of measuring means. This also means that the circuit using integrators more nearly takes into account the full signals which are produced a condition that is not true of any known device. The present construction also provides broader bandwidth characteristics such for example an 8 Megahertz bandwidth and with an improved signal-to-noise ratio. The other elements of the integrator circuit of FIG. 7 are similar to the corresponding elements of the circuit of FIG. 6.

The preamplifier circuits 22, the charge integrator circuits 24, the threshold detector circuits 25, the holding circuits 26, the log amplifier circuits 28, the differential amplifier circuits 30, and the amplifier-filter circuits 32 may all be of a known construction and it is not deemed necessary to describe their circuit details since there are many possibilities and ways to construct them, and such details are only incidental to the main features and purpose of the invention. It is necessary, however, to select a detector for the detector 12 which produces output signal responses. As indicated above, there are known and available semi-conductor and other types of detectors that can be used including those which employ Schottky barriers and p-n junctions.

There are also many uses and applications for circuits such as the present circuit including uses in any situations where it is desired to locate, track or guide an object for some purposes as well as in various types of optical communication systems including also alignment systems and/or tools and related devices and systems.

Thus there has been shown and described a novel pulse optical radiation tracker circuit which fulfills all of the objects and advantages sought therefor. It will be apparent, however, that many changes, modifications, variations and other uses and applications of the subject circuit are possible and are within the scope of the present application. All such changes, modifications, variations, and other uses and applications which do not depart from the intentions and scope of the invention are deemed to be covered by the invention which is limited only by the claims which follow.

What is claimed is:

1. Means to produce responses indicative of the location of a light source comprising a light source, a light sensitive detector element including means to generate output electrical responses when light from said source impinges thereon, said detector element including a wafer member having a plurality of spaced electrodes at which electrical signal responses are produced when light impinges thereon, the magnitude of the responses produced at the respective electrodes being inversely proportional to the distance from the said respective electrodes to where the light impinges on the wafer member, an electric circuit including a pair of similar circuit channels each having an input and an output, means respectively connecting two of said spaced detector electrodes to the inputs of said channels, each of said channels including signal amplifier means, signal limiting means, and means for producing channel output signals that are represented as logarithmic functions of the respective signals, and differential circuit means having inputs connected to the respective channel outputs, said differential circuit means combining the outputs signals from the channels to produce an output representing the difference between the outputs of the channels.

2. The means defined in claim 1 wherein the light source is a pulse modulated light source.

3. The means defined in claim 1 wherein the light source is a pulse modulated laser light source.

4. The means defined in claim 1 wherein said detector element has two pairs of spaced opposed electrodes, the electrodes of one pair being angularly oriented on the detector element relative to the other of said pairs, and a pair of similar circuit channels connected respectively to the electrodes of each of said pairs.

5. The means defined in claim 2 including means to improve signal-to-noise ratio of the electric circuit, said means including means to inhibit passage of electric energy by the channels during time intervals between occurrences of succeeding signal pulses.

6. The means defined in claim 1 wherein the signal limiting means in each of said channels is a threshold circuit having means biasing it to a condition that prevents the passage of electric energy of less than a predetermined magnitude.

7. The means defined in claim 1 wherein the detector element is constructed of solid state materials and includes means forming a barrier therein.

8. The means defined in claim 1 wherein the detector element is a p–n junction device.

9. Circuit means for producing output responses to indicate the position of a source of radiation energy relative to angularly related directions in space, radiation from said source impinging on a light responsive detector that has pairs of spaced opposed electrodes at which respective electric signals are produced when light from the source impinges on the detector, the electrodes of said pairs being angularly related to each other on the detector, said signals varying in magnitude inversely relative to the distance between where the light impinges on the detector and the respective electrodes, said circuit means comprising first and second pairs of similar channels each having an input amplifier stage, means connecting the input amplifier stages of said first pair of channels to respective ones of the electrodes of one of said pairs, means connecting the input amplifiers of the second pair of channels to respective ones of the electrodes of the other of said pairs, a threshold circuit in each channel connected to receive the outputs of the respective amplifier stages, said threshold circuits including means to permit the passage therethrough only of those inputs which exceed some preestablished threshold level, a hold circuit in each channel connected to receive the outputs of the respective threshold circuits and including means to stretch the responses that are received thereat, a logarithmic amplifier circuit in each channel connected to the respective outputs of the channel hold circuits to produce outputs that are logarithmic functions of the respective channel signals, and first and second differential amplifier circuits each having first and second inputs connected respectively to receive the outputs of the logarithmic amplifier circuits in the channels associated with a respective pair of opposed detector electrodes, each of said differential amplifier circuits combining the signals it receives and producing outputs which represent the difference therebetween, the outputs of said first differential amplifier circuit having magnitudes and polarities which represents the position of the radiation source relative to the electrodes of said first pair, and the outputs of said second differential amplifier circuit having magnitudes and polarities which represent the position of the radiation source relative to the electrodes of said second pair.

10. The circuit means for producing output responses defined in claim 9 wherein one of said pairs of opposed detector electrodes are oriented to produce electric responses that represent the pitch position of the radiation source, the other of said pairs of opposed detector electrodes are oriented to produce electric responses that represent the yaw position of the radiation source.

11. The means for producing output responses defined in claim 9 including a summing circuit having a separate input connection to the outputs of each of the threshold circuits in said channels, an inhibit circuit connected to receive the output of the summing circuit, and means connecting the output of the inhibit circuit to the input amplifier circuits, the outputs from said inhibit circuit operating to prevent said amplifier circuits from passing signals to the respective threshold circuits during preselected time intervals.

12. The means defined in claim 9 wherein the radiation energy impinging on the detector is pulse modulated radiation energy.

13. The circuit means defined in claim 9 including charge integrator means positioned in each of said channel between the input amplifier stage and the threshold circuit.

14. The circuit means defined in claim 13 wherein said charge integrator circuit in each channel includes charge storage means and switch means movable between an integrate position in which the charge storage means can accumulate charge and a position in which the charge on the charge storage means is dissipated.

15. The circuit means defined in claim 14 wherein the charge storage means in each channel are connected in series between the input amplifier stage and the threshold circuit.

16. The circuit means defined in claim 14 wherein said charge integrator circuit in each channel includes amplifier means in series between the input amplifier stage and the threshold circuit, said charge storage means being connected in parallel with said amplifying means in each of said channels.

17. The circuit means defined in claim 14 wherein said charge integrator circuit in each channel includes a first switch connected in series between the amplifier stage and the threshold circuit, and a second switch and associated means to control whether the charge storage means are in a charging or a charge dissipating condition.

18. Means to produce responses indicative of the location of a light emitting object relative to a fixed location in space comprising an object with a light emitting source thereon, a light sensitive detector element located at the fixed location including means to generate output electrical responses when light from said source impinges thereon, said detector element including a semi-conductor wafer having a plurality of spaced electrodes at which the electrical signal responses are produced, the magnitudes of the responses at the respective electrodes varying with the distance from where the light impinges on the detector element relative thereto, and electric circuit means including pairs of similar circuit channels each channel having input and output connections, means respectively connecting two of said spaced detector electrodes to the input connections of two of said channels, means respectively connecting other of said spaced detector electrodes to the inputs of two other of said channels, each of said channels including amplifier means, threshold means capable of limiting passage therethrough to responses having magnitudes greater than a predetermined magnitude, response stretching and response logarithmic amplifying means in each channel, and a differential signal circuit connected to the outputs of the channels of one of said pairs of channels to produce output signals which represent the differences between the output responses from the channels of said one of said pairs, and a second differential signal circuit connected to the outputs of the channels in the other of said pair of channels to produce output signals which represent the difference between the output responses of the channels of said other pair.

19. The means to produce responses defined in claim 18 including an integrating circuit means in each channel connected between the signal amplifier means and the threshold means, each of said integrating circuits including charge storage and charge discharging means, and switch means operable to control whether the integrating circuits are in a charging or discharging condition.

20. The means to produce responses defined in claim 18 including means for combining the outputs of the threshold means in each of said channel to produce a control signal representing the combination thereof, gate means connected to respond to the output of said signal combining circuit, and means connecting the output of said gate circuit to the input amplifier means in each of said channels, said amplifier means including means under control of the gate circuit output to control the passage of input signals received from the detector electrodes therethrough.

21. The means defined in claim 19 wherein said integrating circuit means in each channel includes charge storage means connected in series between the channel amplifier means and the threshold means.

22. The means defined in claim 18 including a charge integrator circuit connected into each channel between the channel input amplifier means and the response stretching means, said charge integrator circuits each including other response amplifying means and charge storage means connected in parallel therewith, and switching means to control whether the charge storage means are in a charging or discharging condition.

23. The means to produce responses defined in claim 18 wherein said light sensitive detector element is a Schottky barrier device.

24. The means to produce responses defined in claim 18 wherein said light sensitive detector element is a p-n junction device.

* * * * *